(12) United States Patent
Oler

(10) Patent No.: US 9,366,276 B1
(45) Date of Patent: Jun. 14, 2016

(54) UPLIFT AND LATERAL RESTRAINT SYSTEM TO SECURE A DRILLING RIG TO AN OFFSHORE PLATFORM

(71) Applicant: G8R, LLC, Bixby, OK (US)

(72) Inventor: Scott Dale Oler, Bixby, OK (US)

( * ) Notice: Subject to any disclaimer, the term of this patent is extended or adjusted under 35 U.S.C. 154(b) by 118 days.

(21) Appl. No.: 14/227,350

(22) Filed: Mar. 27, 2014

Related U.S. Application Data

(60) Provisional application No. 61/853,254, filed on Mar. 29, 2013.

(51) Int. Cl.
 *F16B 5/06* (2006.01)
 *F16B 2/10* (2006.01)
 *F16B 7/04* (2006.01)

(52) U.S. Cl.
 CPC .............. *F16B 2/10* (2013.01); *F16B 7/0433* (2013.01); *Y10T 403/648* (2015.01)

(58) Field of Classification Search
 CPC ..... F16B 2/10; F16B 7/0433; Y10T 403/648; B66C 1/64
 USPC ................. 403/335, 336, 337, 338; 294/104
 See application file for complete search history.

(56) References Cited

U.S. PATENT DOCUMENTS

| | | | |
|---|---|---|---|
| 1,651,663 A | 12/1927 | Black | |
| 1,672,720 A | 6/1928 | Horsfall | |
| 2,078,848 A * | 4/1937 | Greger | B66C 1/64 294/102.1 |
| 3,084,893 A | 4/1963 | Ruth | |
| 3,178,219 A * | 4/1965 | Renfroe | B66C 1/64 294/104 |
| 3,538,559 A | 11/1970 | Rives | |
| 3,567,169 A * | 3/1971 | Frederick | B66C 1/64 118/500 |
| 3,572,808 A * | 3/1971 | Miller | B66C 1/64 294/118 |
| 3,895,836 A * | 7/1975 | Barnes | B66C 1/64 24/600.8 |
| 3,942,834 A * | 3/1976 | Kawaguchi | B66C 1/64 294/106 |
| 3,958,825 A * | 5/1976 | Diamond | B66C 1/64 294/82.13 |
| 4,215,848 A | 8/1980 | Van de Werken | |
| 4,333,634 A | 6/1982 | Malzacher | |
| 4,348,007 A | 9/1982 | Malzacher | |
| 4,563,109 A | 1/1986 | Ortemond | |
| 4,938,628 A | 7/1990 | Ingle | |
| 5,032,040 A | 7/1991 | Ingle | |
| 5,052,860 A | 10/1991 | Ingle | |
| 5,139,367 A | 8/1992 | Ingle | |
| 5,468,035 A * | 11/1995 | Fountain | B66C 1/64 248/228.4 |
| 6,253,631 B1 | 7/2001 | McCain et al. | |
| 8,038,106 B2 | 10/2011 | Magno, Jr. et al. | |

FOREIGN PATENT DOCUMENTS

FR          2839961 A1 *  11/2003  ............... B66C 1/64

* cited by examiner

*Primary Examiner* — Gregory Binda
*Assistant Examiner* — Nahid Amiri
(74) *Attorney, Agent, or Firm* — GableGotwals

(57) ABSTRACT

A restraint system for securing a drilling rig to an off-shore platform. The system having uplift and lateral restraints. The uplift restraints including upper and lower jaws connected by a common pin component. The restraint system may include transverse jaws connected to the upper and lower jaws via the common pin. The number of various jaws can be varied depending upon loading in order to minimize pin size.

12 Claims, 5 Drawing Sheets

UPLIFT AND LATERAL RESTRAINT SYSTEM TO SECURE A DRILLING RIG TO AN OFFSHORE PLATFORM

CROSS-REFERENCE TO RELATED APPLICATIONS

The present application is a conversion of U.S. Provisional Patent Application No. 61/853,254 filed on Mar. 29, 2013 which is incorporated herein by reference.

FIELD OF THE INVENTION

The present invention relates generally to a method and apparatus for securing a structure to an I-beam. More particularly, the present invention relates to an apparatus and method for securing a drilling rig to an offshore platform.

BACKGROUND OF THE INVENTION

Securing of an offshore platform-drilling rig has received increased focus in the years following Hurricanes Ivan, Katrina and Rita. The level of loading expected from hurricanes has increased. The need to achieve a greater margin of safety against the failure of systems that secure these structures during these events is required for both existing and future structures.

The need to provide an improved, more robust method of securing these type of structures against this increased level of loading can prohibit the use of conventional means of support and materials typical for these structures.

This presents challenges in fabrication and increases cost and complexity. Equipping existing structures with a more robust system presents the greatest challenge as the existing geometry can limit the amount of strengthening available and the existing fabrication tolerances may be prohibitive for more precise systems.

Higher strength steel can provide an increased capacity however, the cost and complexity of fabrication, commonly done by welding, is also increased. Further the use of larger, heavier components would make them less safe to handle.

Therefore what is needed is an apparatus and method to provide a cost effective and robust system for securing a drilling rig. The system presented herein provides a unique yet simple solution to these challenges at a considerable cost savings to the end user.

The foregoing and other objectives, features, and advantages of the invention will be more readily understood upon the consideration of the following detailed description of the invention.

BRIEF SUMMARY OF THE INVENTION

The invention described provides an improved and novel system for restraints to resist uplift and lateral movement at the off-shore platform support location comprising uplift and lateral restraints. The uplift restraints include upper jaw plates and lower jaw plates connected by a common pin component. These restraints may resist transverse loading in one direction or in other embodiments resist multi directional loading and/or movement. Transverse restraints include transverse jaws connected by a common pin to an eye plate or uplift restraints. The uplift restraints provide resistance to transverse loads in addition to resistance to uplift loads.

The lower jaw contacts the underside of the foundation beam flange. The upper jaw contacts the footing on the structure wherein jaw plates are connected by a pin creating a novel locking mechanism that resists rotation about the pin connection.

Multiple combinations of upper and lower jaw plates may be utilized to accommodate many different geometric constraint requirements and conditions.

Benefits

No welding required for installation of embodiments of the present invention which use existing eye plates or include uplift restraints. Thus production does not need to be halted during installation. Should welding be used for connecting the eye plates, they may be fabricated from material compatible with welding to the material of the drilling rig.

All components may be constructed without welding, thus more material options than prior art systems are available.

Eye plates may be connected by welding, bolting, clamping or other method known in the field.

Flexibility in placement of the restraints along the footing allows for conforming to existing platform geometry or platform support strengthening.

Jaw plates may be stacked in various combination to allow for orienting locking plates for better access to operate.

Short fabrication time due to no welding required and ability to cut using automated processes with minimal machining allows for case of adapting to changes in criteria or geometry during construction or while in service.

Use of a bolt for the locking plate mechanism provides a self-locking system to prevent accidental disengagement.

The simplicity of the system allows for ease of training to operate which in turn increases the chance of getting it right the first time and increases safety of the operator.

Lower jaw plate (uplift restraint) may be rotated above the top of a capping beam for skidding clearance.

Large contact length along footing (over 44% of footing width possible).

Multiple plates equal greater redundancy.

Only the removal of a pin is required for maintenance or replacement of the system.

It may be thus seen that the objects of the present invention set forth, as well as those made apparent from the forgoing description are efficiently attained. While preferred embodiments of the invention have been set forth for purposes of disclosure, modifications of the disclosure embodiments of the invention as well as other embodiments thereof may occur to those skilled in the art accordingly.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

Figure 1:
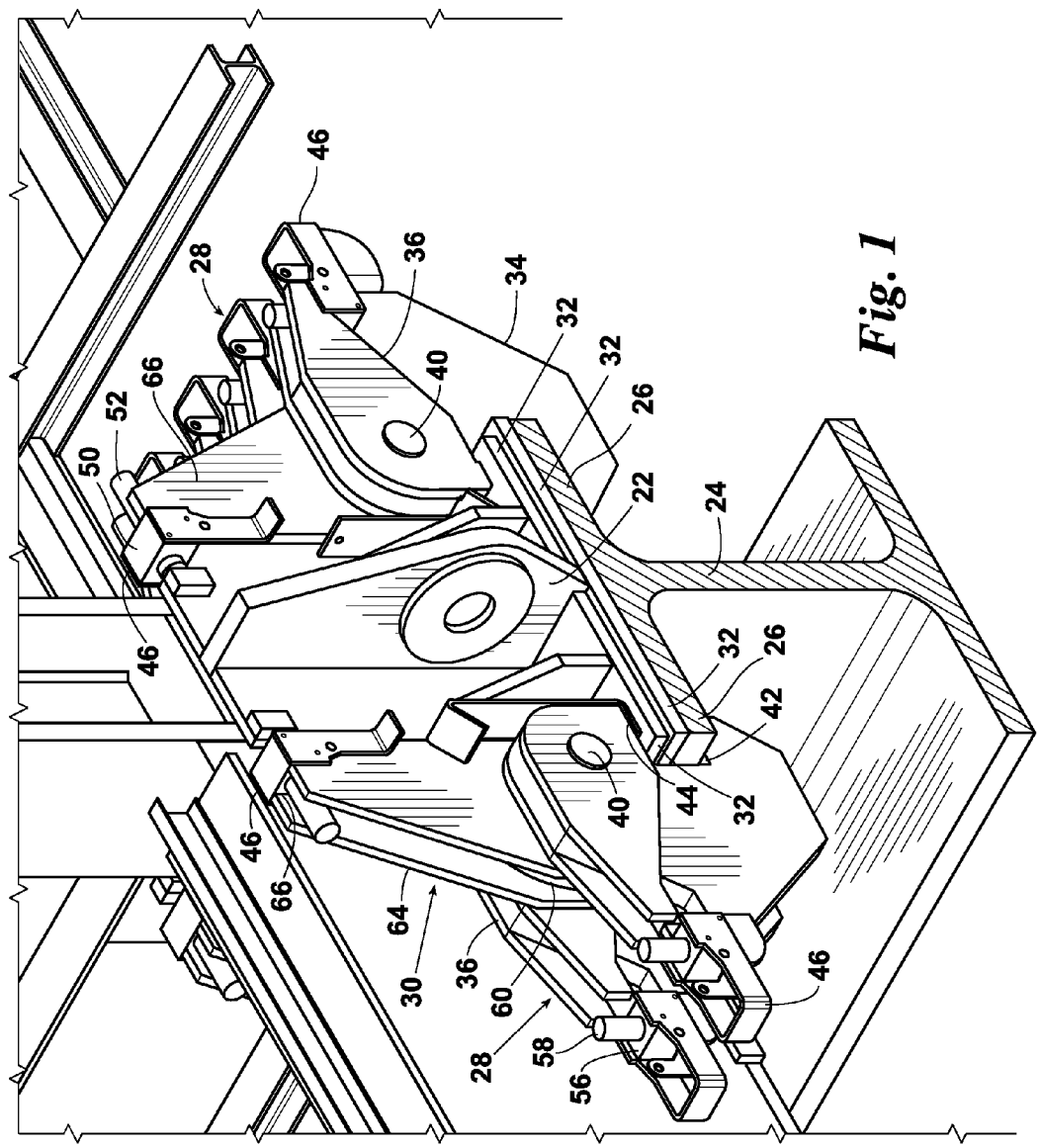
FIG. 1 is a perspective view of the present invention with both uplift and lateral restraints.

Elements and element numbering used in the drawing figures

| | | | |
|---|---|---|---|
| 20 | Restraint system | 46 | Locking mechanisms |
| 22 | Structure | 48 | Locking mechanism surface |
| 24 | Foundation beam | 50 | Plate (locking mechanism) |
| 26 | Flanges (foundation beam) | 52 | Bolt |
| 28 | Uplift restraints | 54 | Holes (locking mechanism plate) |
| 30 | Lateral restraints | 56 | Body (locking mechanism) |
| 32 | Footing (structure) | 58 | Elongated member (locking mechanism) |
| 34 | Lower jaw plates | | |
| 36 | Upper jaw plates | 60 | Eye plate |
| 38 | Aperture (lower jaw, upper jaw, transverse jaw) | 62 | Opening (eye plate) |
| | | 64 | Transverse jaw |
| 40 | Pin | 66 | Lock mechanism surface |
| 42 | Contacting surface (lower jaw) | 68 | Keeper (pin) |
| 44 | Contacting surface (upper jaw) | 70 | Contacting surface |

DETAILED DESCRIPTION OF THE PREFERRED EMBODIMENT(S)

Turning now to the drawings wherein like reference characters indicate like or similar parts throughout, FIGS. 1 through 9 illustrate various aspects of the present invention. The uplift and transverse restraint system 20 presented provides a means of securing a structure 22 such as a drilling rig to a foundation beam 24 on an offshore platform. The foundation beam 24 includes a flange 26 upon which the structure 22 is supported The restraint system 20 includes uplift restraints 28 to resist overturning loads producing uplift. Lateral restraints 30 resist movement of the structure 22 in a horizontal direction relative to the foundation beam 24.

The type of structure 22 for which this restraint system 20 secures requires the ability of the structure 22 to be translated (referred to as skid) along the foundation beam 24. The restraint system 20 disengages to allow the structure to be to skid along the foundation beam 24. The relative position of the structure footing 32 to the foundation beam 24 can vary slightly for different positions of the structure 22 due to the nature of the skidding process and fabrication tolerances.

Clearance below the foundation beam flange 26 is required for the uplift restraint 28 to engage the underside of the foundation beam 24 to secure it against uplift at the secured locations. The loads produced on structures 22 such as drilling rigs during storms and seismic events are significant and require the use of high strength material. Structures 22, such as drilling rigs, are typically made from carbon steel using welding as the method of fabrication.

Uplift Restraints

The uplift restraint 28 is comprised of set(s) of lower jaw(s) 34 and upper jaw(s) 36. Both upper and lower jaws 34 and 36 have an aperture 38 through which a round bar, referred to as a pin 40 is placed. The pin 40 allows rotation of the upper and lower jaws 34 and 36 relative to one another. The lower jaw 34 has a contacting surface 42 which contacts the underside of the foundation beam flange 26. The upper jaw 36 has a contacting surface 44 which contacts the footing 32 of the structure 22 being restrained.

Figure 2:
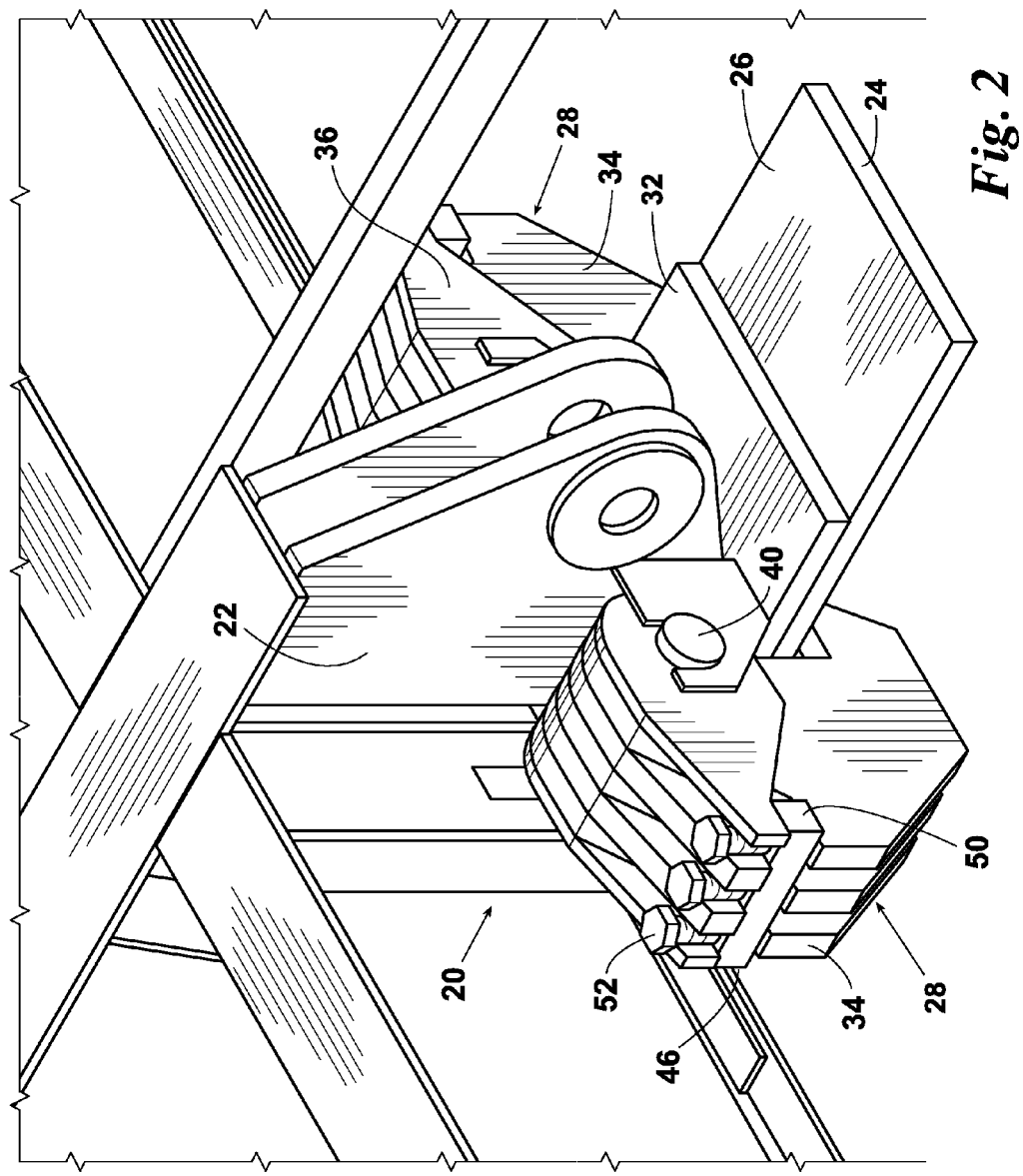
FIG. 2 is a perspective view of the present invention with the uplift restraints installed.
Figure 3:
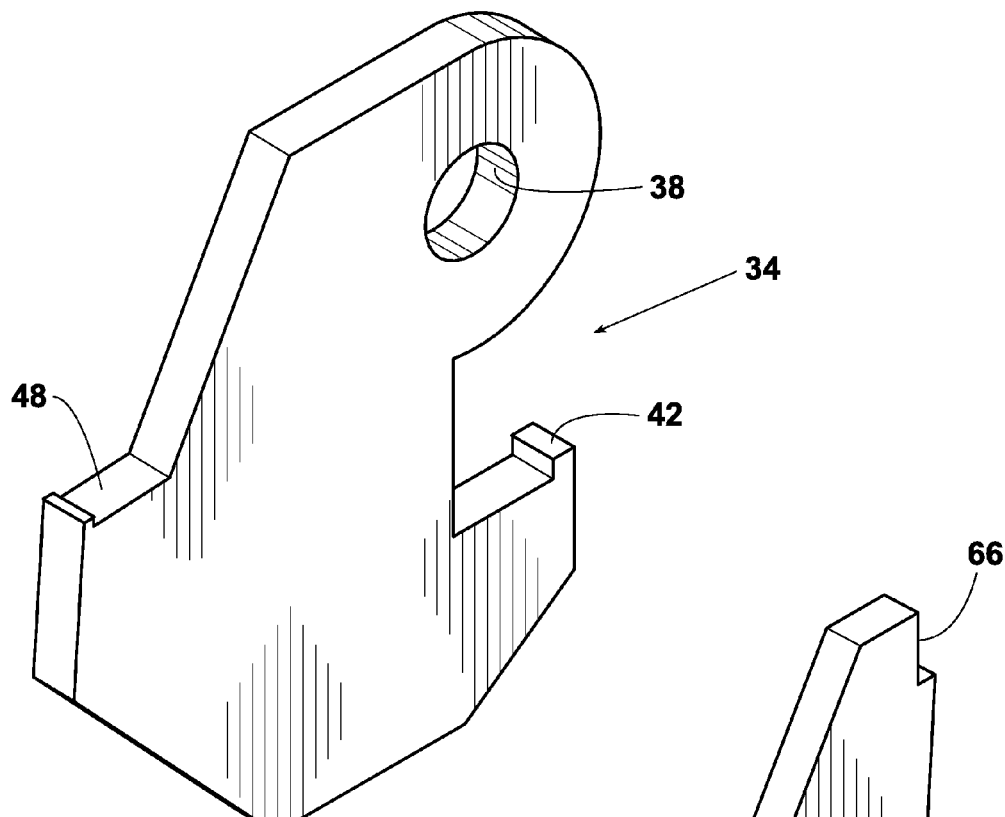
FIG. 3 is a perspective view of an uplift restraint lower jaw.
Figure 4:
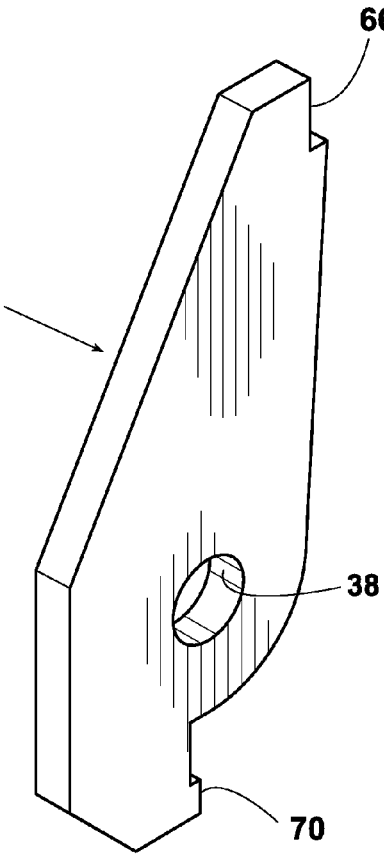
FIG. 4 is a perspective view of a transverse restraint jaw.
Figure 5:
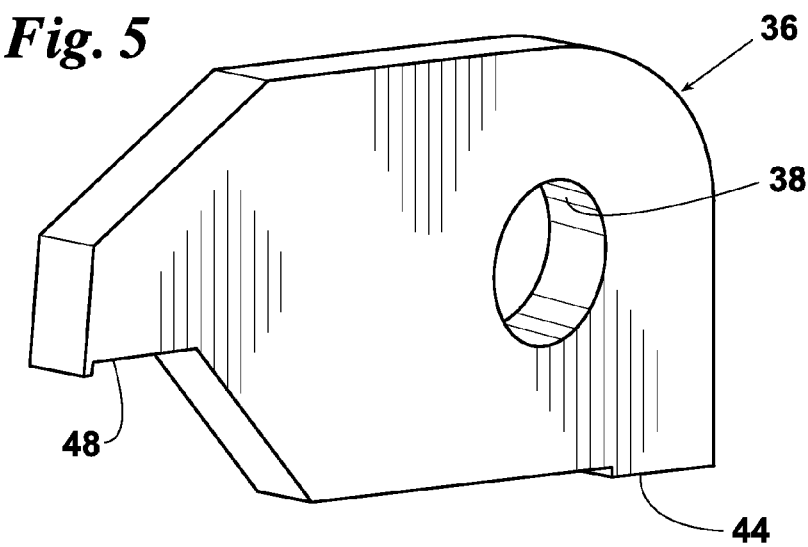
FIG. 5 is a perspective view of an uplift restraint upper jaw.
Figure 6:
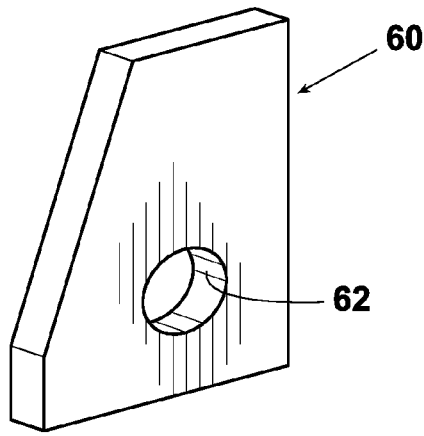
FIG. 6 is a perspective view of an eye plate.
Figure 7:
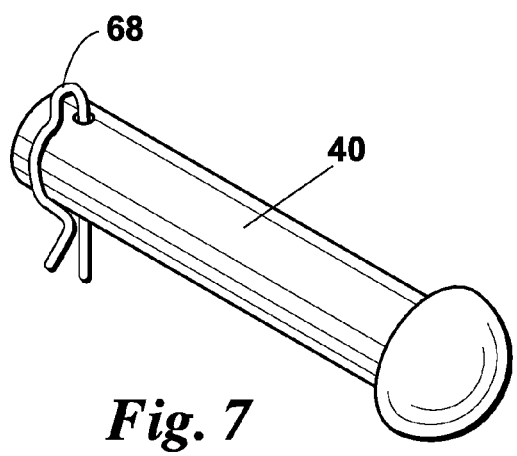
FIG. 7 is a perspective view of a pin.

A locking mechanism 46 contacts the locking mechanism surfaces 48 of the lower and upper jaws 34 and 36 as seen in FIGS. 1 and 2. In the preferred embodiment the apertures 38 are located between (as relates to the load path) the contacting surfaces (42 and 44) and the locking mechanism surfaces 48 on both of the lower and upper jaws 34 and 36. In this embodiment the clamping force on the footing 32 and foundation beam flange 26 can be increased by providing a greater lever arm or distance between the locking mechanism surface 48 and aperture 38 than the lever arm or distance between the contacting surface 42 or 44 and the aperture 38. Put another way, load on the locking mechanism 46 can be reduced by increasing the distance or load path between the locking mechanism surface 48 and the pin 40 or fulcrum while maintaining the same distance or load path between contacting surface 44 and the pin 40 or fulcrum.

Figure 8:
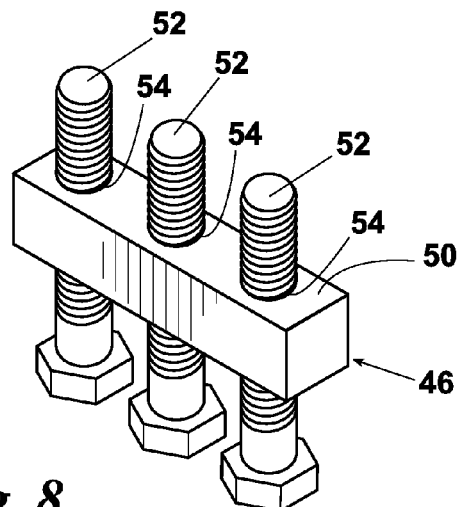
FIG. 8 is a perspective view of one embodiment of a locking mechanism.
Figure 9:
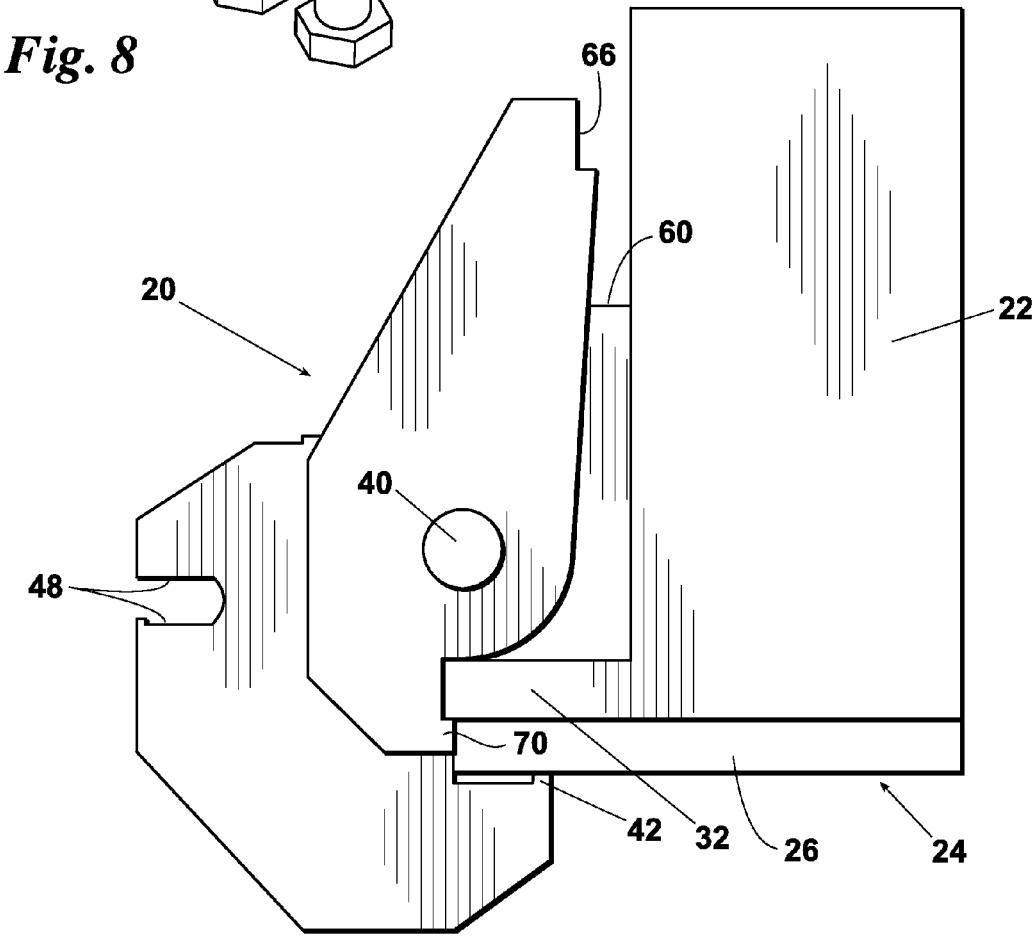
FIG. 9 is an end view of the restraint system with uplift and lateral restraints installed on a structure and foundation beam without the locking mechanism.

As seen in FIG. 8, the locking mechanism 46 is comprised of an element or locking plate 50 that spans between the locking mechanism surfaces 48 of the adjacent pairs of upper or lower jaws 34 and 36 and bears on the opposing jaws 34 and 36. The bearing is achieved by means such as an elongated self-locking threaded element or bolt 52 which threadedly engages with a hole 54 or holes 54 in the locking plate 50. The separation of the structure 22 from the foundation beam flange 26 creates a fulcrum about the pin 40. The locking mechanism 46 resists rotation about the pin 40.

The locking mechanism 46 could take other forms as well such as a body 56, as seen in FIG. 1, which spans across the locking mechanism surfaces 48 of adjacent lower jaws 34 or upper jaws 36 with extendable elongated members 58 which engage with the locking mechanism surfaces 48 opposing the locking mechanism surfaces 48 engaged with the body 56. The elongated members 58 could be extended by hydraulic, mechanical or other means. This would open the possibility of operating the restraint system 20 remotely.

Different combinations of upper and lower jaws 34 and 36 are possible to accommodate geometric constraints and uplift load magnitude. The number of jaws 34 and 36 in a set of uplift restraints and the distance from the fulcrum (pin 40) would determine the size of the locking mechanism 46.

The opposing jaws 34 and 36 are arranged in such a way as to not transfer load through the pin 40 to adjacent sets of uplift or transverse restraints 28 or 30. This is accomplished by means of providing one more jaw 34 or 36 than the opposing jaw(s) 34 or 36 and creating multiple shear planes in the pin 40.

The uplift restraints 28 do not rely on the eye plate 60 or the transverse restraints 30 to secure the structure against uplift loading. The pin 40 is common to both uplift and transverse restraints 28 and 30. This reduces the number of components and provides a means to stow or maintain the location of the restraints 28 and 30 when disengaged.

The uplift jaws 36 are cut from plate of high strength material such as heat-treated high strength steel. The lower, upper and transverse jaws 34, 36 and 64 may all be cut from the same materials. Welding is not required to create these components resulting in a low cost of fabrication compared to welded components.

Transverse Restraint

The transverse restraints 30 are affixed to the structure 22 by use of connecting element such as an eye plate 60 that is similar to a commonly used eye plate 60 used for lifting. The eye plates 60 have an opening 62 sized and located to receive the pin 40 The common method for affixing an eye plate 60 to the structure is welding. Once the eye plate 60 is affixed to the structure, the transverse jaws 64 that make up the transverse restraint 30 are attached to the eye plate 60 by use of the pin 40.

The transverse jaw 64 oppose the eye plate 60 in the same manner as the upper and lower jaws 34 and 36 of the uplift restraint 28. The pin 40 passes through an aperture 38 in the transverse jaw 64. A locking mechanism 46 similar to that of the uplift restraint 28 provides the resistance to rotation about the pin 40.

The locking mechanism 46 spans from the structure and bears on the locking mechanism surface 66 of the transverse jaw 64 or eye plates 60 and bears against the opposing jaw plates. The adjustable locking mechanism 46 may also bear on the structure. Different combinations of transverse jaws 64 and eye plates 60 may be used to accommodate geometric constraints and transverse load magnitude.

The eye plate 60 can be made from material compatible with that of the structure such as carbon steel and may be welded using common fabrication practice for the industry.

Transverse jaws 64 are cut from plate of high strength material such as heat-treated high strength steel. Welding is not required to create the transverse jaws 64 resulting in a low cost of fabrication compared to welded components.

Common Components

The pin 40 provides the shear resistance between opposing jaws 34, 36 and 64 both uplift and transverse. The pin 40 is affixed in place after stacking the desired sets of jaw plates 34, 36 and 64 by a keeper 68. This maintains the position of the pin 40 axially once installed. The pin 40 collects all the jaw plates 34, 36 and 64 and provides a simple means of keeping the components in place whether engaged or disengaged.

This reduces the complexity of the system 20 and reduces handling. The added benefit of a common pin 40 for the uplift and transverse restraint 28 and 30 is the ease of maintenance and replacement or addition of jaw plate 34, 36 and 64. The pin 40 is made from high strength material such as heat-treated alloy steel. As with the other components, no welding is required to create this component.

The adjustable locking mechanisms 46 for the uplift and transverse restraints 28 and 30 provide a means of locking the moving parts in place to secure the structure 22. They provide adjustment to accommodate fabrication tolerances in the structure and foundation beam.

The adjustable locking mechanisms 46 may be energized by means such as human strength (tightening of a bolt), mechanical advantage or stored energy. They resist accidental disengagement by means such as a self-locking threaded element 52 or a mechanical stop.

The use of a threaded element 52 provides the ease of use by only requiring a common operation (tightening of a bolt) to secure. As the pin 40 collects all other components, the locking mechanisms 46 are the only potentially "loose" components.

The load transmitted to the locking mechanism 46 from the contacting surfaces 42, 44 and 70 of the uplift restraint and the transverse restraints 28 and 30 is reduced by the ratio of the distance from the contacting surfaces 42, 44 and 70 to the pin 40 and the distance from the pin 40 to the locking mechanism surface 48 and 66.

This results in less material required and thus lighter pieces that would increase handling safety. These components may be secured to other components to eliminate all loose pieces and reduce handling which further increases the safety of the restraint system 20.

Additional Features

The geometry of the lower jaw 34 and location of the pin 40 in them provides for variance of the foundation beam 24 such as that resulting from fabrication tolerance and flexing of the foundation beam 24 or structure 22. The adjustable locking mechanism 46 on the uplift restraint 28 provides the means to account for this variance as well.

The adjustable locking mechanism 46 on the transverse restraint 30 allow for variance in the relative position of the structure 22 in different locations such as after skidding along the foundation beam 24. The lower jaw 34 of the uplift restraint 28 can rotate above the foundation beam 24 to allow clearance when the structure 22 is skid or to provide access below the foundation beam 24.

The stacking of opposing jaws 34, 36 and 64 is unique to this system as it allows for individual jaws 34, 36 and 64 to be of less thickness and thus lighter for safer handling. Material commonly used as high strength steel also provides greater strength to limited thicknesses.

Stacking multiple plates 34, 36 and 64 also provides for increased contact along the structure footing 32 and the foundation beam 24 resulting in greater redundancy in margin against failure of the restraint system 20. Stacking of multiple jaws 34, 36 and 64 also allows for more options to suit varying geometries of the structure 22 or foundation beam 24. Stacking of the jaws 34, 36 and 64 creates multiple shear planes along the pin 40 allowing for the reduction in size and weight of the pin 40 thus improving handling safety and material cost. This also lowers bearing load on the contacting surfaces 42 and 44

All components may be made from high strength material such as heat-treated steel. No welding is required to create any of the components. This allows for the use of materials that can be treated to provide increased levels of performance and margin against failure without concerns for the effects of welding on the material.

Materials previously excluded from consideration may now be utilized such as stainless steels and composites. Further different forms of manufacture of material may be considered such as cast steel or forged steel.

As jaws 34, 36 and 64 would typically be cut from plate and stacked in the restraint system, the ability to adapt to variances in fabrication tolerances and unknown geometry is achieved. New shapes may be quickly produced or the stacking arrangement changed to accommodate field variance or criteria changes.

Shapes would also lend themselves to field modification (where full construction capabilities may not exist such as on offshore platforms) by trimming interferences as opposed to systems using fabricated components.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. An apparatus for restraining a structure to a foundation beam, the apparatus comprising:
    an uplift restraint lower jaw with a contacting surface, a locking mechanism surface and an aperture;
    an uplift restraint upper jaw with a contacting surface, a locking mechanism surface and an aperture;
    a locking mechanism capable of and located for exerting a force on the locking surface of the uplift restraint lower jaw and the locking surface of the uplift restraint upper jaw; and
    a pin sized to pass through the aperture of the uplift restraint lower jaw and the uplift restraint upper jaw and rotatably connecting them to one another;

wherein a distance from the aperture and the contacting surface of the uplift restraint lower jaw is less than a distance from the aperture to the locking surface of the uplift restraint lower jaw.

2. The apparatus of claim 1, further comprising:

the aperture of uplift restraint lower jaw being located between the contacting surface and the locking surface, a pivot connection being attached to the uplift restraint upper jaw at a point between the contacting surface and the locking mechanism surface.

3. The apparatus of claim 2, further comprising:

a distance from the aperture and the contacting surface of the uplift restraint upper jaw is less than a distance from the aperture to the locking surface of the uplift restraint upper jaw.

4. The apparatus of claim 1, further comprising:

an eye plate securable to the structure and having an opening sized and located to receive the pin.

5. The apparatus of claim 4 further comprising at least one eye plate.

6. The apparatus of claim 1 further comprising at least one uplift restraint lower jaw.

7. The apparatus of claim 1 further comprising at least one uplift restraint upper jaws.

8. An apparatus for restraining a structure to a foundation beam, the apparatus comprising:

an uplift restraint lower jaw with a contacting surface, a locking mechanism surface and an aperture;

an uplift restraint upper jaw with a contacting surface, a locking mechanism surface and an aperture;

a locking mechanism capable of and located for exerting a force on the locking surface of the uplift restraint lower jaw and the locking surface of the uplift restraint upper jaw;

a pin sized to pass through the aperture of the uplift restraint lower jaw and the uplift restraint upper jaw and rotatably connecting them to one another; and a locking plate having a plurality of holes, each hole having an internal thread and an elongated member with an external thread engaged with the internal thread wherein the locking plate is in contact with one of the locking surfaces of the uplift restraint lower jaw and the uplift restraint upper jaw and the elongated member is in contact with one of the locking surfaces of the uplift restraint lower jaw and the uplift restraint upper jaw which in not in contact with the locking plate.

9. An apparatus for restraining a structure to a foundation beam, the apparatus comprising:

an uplift restraint lower jaw with a contacting surface, a locking mechanism surface and an aperture;

an uplift restraint upper jaw with a contacting surface, a locking mechanism surface and an aperture;

a locking mechanism capable of and located for exerting a force on the locking surface of the uplift restraint lower jaw and the locking surface of the uplift restraint upper jaw;

a pin sized to pass through the aperture of the uplift restraint lower jaw and the uplift restraint upper jaw and rotatably connecting them to one another; and a transverse jaw having a contacting surface; a locking mechanism surface; a locking mechanism engaged with the locking mechanism surface and the structure; and an aperture sized and located to receive the pin.

10. An apparatus for restraining a structure to a foundation beam, the apparatus comprising:

a pin;

an eye plate securable to the structure and having an opening sized and located to receive the pin;

a transverse jaw having a contacting surface; a locking mechanism surface; a locking mechanism engaged with the locking mechanism surface and engageable with the structure; and an aperture sized and located to receive the pin;

wherein the locking mechanism holds the transverse jaw stationary relative to the structure.

11. The apparatus of claim 10 further comprising:

an uplift restraint lower jaw with a contacting surface, a locking mechanism surface and an aperture;

an uplift restraint upper jaw with a contacting surface, a locking mechanism surface and an aperture;

a locking mechanism capable of and located for exerting a force on the locking surface of the uplift restraint lower jaw and the locking surface of the uplift restraint upper jaw; and wherein the pin passes through the aperture of the uplift restraint lower jaw and the uplift restraint upper jaw, the aperture of the transverse jaw and rotatably connecting them to one another.

12. The apparatus of claim 11, said locking mechanism comprising:

a locking plate having a plurality of holes, each hole having an internal thread; and an elongated member with an external thread engaged with the internal thread;

wherein the locking plate is in contact with one of the locking surfaces of the transverse jaw and the structure and the elongated member is in contact with one of the locking surfaces of the transverse jaw and the structure which in not in contact with the locking plate.

\* \* \* \* \*